United States Patent [19]

Blainey

[11] Patent Number: 5,613,121

[45] Date of Patent: Mar. 18, 1997

[54] METHOD AND SYSTEM OF GENERATING COMBINED STORAGE REFERENCES

[75] Inventor: Robert J. Blainey, North York, Canada

[73] Assignee: International Business Machines Corporation, Armonk, N.Y.

[21] Appl. No.: 326,130

[22] Filed: Oct. 19, 1994

[51] Int. Cl.$^6$ .................................................. G06F 9/45
[52] U.S. Cl. ............................................................. 395/709
[58] Field of Search ..................... 364/DIG. 1 MS File, 364/DIG. 2 MS File; 295/375, 700

[56] References Cited

U.S. PATENT DOCUMENTS

4,642,764  2/1987  Auslander et al. ..................... 395/700
4,667,290  5/1987  Goss et al. ............................. 395/700
5,107,418  4/1992  Cramer et al. ......................... 395/700

*Primary Examiner*—Robert B. Harrell
*Attorney, Agent, or Firm*—Diana L. Roberts

[57] ABSTRACT

A novel method and system for optimizing the instructions produced by a compiler comprises examining pairs of load and pairs of store instructions to determine whether a pair of load or a pair of store instructions may be replaced with a single load or store instruction which utilizes the resources of the target data processing system more efficiently. The method and system are transparent to the user who may write the program source code in the conventional manner.

12 Claims, 3 Drawing Sheets

METHOD AND SYSTEM OF GENERATING COMBINED STORAGE REFERENCES

FIELD OF THE INVENTION

The present invention relates to a novel method and system for optimizing program instructions produced by a compiler. More specifically, the present invention relates to a method and system for selectively moving and substituting specific data processing instructions generated by a compiler for other available instructions to benefit from specific hardware features available on the data processing system on which the program is intended to be executed to improve performance.

DESCRIPTION OF THE RELATED ART

Compilers are commonly employed to transform program structures and statements written in a relatively high level program language into instructions, typically referred to as object code or machine code, which can be executed by a data processing system. It is known to perform optimizations on the object code produced by a compiler to achieve improved execution speeds of the optimized object code, to achieve a reduced size of the optimized object code or both. These optimizations can be performed during one or more intermediate passes of the compiler and/or may be performed as a final step in the compilation process.

Many different optimization techniques are known. A common optimization employed in compilers is loop unrolling. In loop unrolling, a program structure including program statements such as:

```
For x = 1 to 10
a[x] = b[x] * (c[x]–d[x])
next x
``` would be converted to program statements such as:

```
For x = 1 to 10 step 2
a[x] = b[x] * (c[x]–d[x])
a[x+1] = b[x+1] * (c[x+1]–d[x+1])
next x
```

In many data processing systems, branch instructions typically require several instruction cycles (also typically referred to as "machine cycles" or "cycles") to execute. The substituted program statements given above involve only half as many branch operations (i.e.—the jump from the "next x" instruction to the "For" instruction). Thus, the 'unrolled' loop will be executed in fewer machine cycles on many data processing systems than would the original program statements.

Many more-complex optimizations exist and are commonly employed, especially in reduced instruction set data processing systems wherein an optimal allocation of general registers in the data processing system can result in a significant increase in program execution speed.

One of the difficulties in implementing optimizations lies in the fact that program statements may be dependent upon other statements such that an optimization cannot be performed. For example, if the above mentioned loop example program statements were:

```
a[x] = 1
For x = 1 to 9
a[x+1] = a[x] * (b[x]–c[x])
next x
``` the loop can not be unrolled as simply as before because each calculation requires (is dependent upon) the result of the previous calculation. Such a program structure is typically referred to as being "not well behaved" while loops and other structures which do not contain dependencies preventing optimizations are typically referred to as "well-behaved". While this particular example of a not well-behaved loop is very simple, optimization of program structures which are not well-behaved is generally very difficult or impossible.

Attempts have been made in the past to provide improved optimization of program structures which are not well-behaved. For example, U.S. Pat. No. 5,107,418 to Cramer et al. describes a system wherein a scalar dependency graph is created and used to determine dependencies of scalar variables prior to optimization. However, this reference and the others of which the present inventor is aware do not permit optimization of both well-behaved and not well-behaved program structures.

SUMMARY OF THE INVENTION

It is an object of the present invention to provide a novel method of optimizing program instructions generated by a compiler to reduce the number of cycles required to execute the program. It is a further object of the present invention to provide a novel optimization system for use with a compiler.

According to one aspect of the present invention, there is provided a method of reducing the number of cycles required to execute a program on a data processing system which provides two-register load and store instructions, comprising the steps of:

(i) dividing the instructions of the program into at least one region of strongly connected instructions;

(ii) subdividing each said at least one region into at least one block of instructions, each said block comprising a sequential series of instructions without jump or branch instructions;

(iii) subdividing each said block into at least one window, each said window comprising a predefined number of instructions;

(iv) for each window in a region, examining each of the instructions in the window to identify load instructions and store instructions;

(v) for each identified load instruction, determining if another identified load instruction exists in the same window with which said identified instruction may be paired for replacement with a two-register load instruction;

(vi) for each determined pair of identified load instructions, replacing the identified load instruction in the pair which precedes the other identified load instruction in the pair with an appropriate two-register load instruction, deleting the other identified load instruction in the pair and noting any addressing adjustments necessitated by said replacement;

(vii) for each identified store instruction, determining if another identified store instruction exists in the same window with which said identified instruction may be paired for replacement with a two-register store instruction;

(viii) for each determined pair of identified store instructions, deleting the identified store instruction which precedes the other identified store instruction in the pair, replacing the other identified store instruction with an appropriate two-register store instruction and noting any addressing adjustments necessitated by said replacement;

(ix) effecting said addressing adjustments noted in steps (vi) and (ix) for the region containing said windows; and (x) repeating steps (iv) through (ix) for each region.

According to another aspect of the present invention, there is provided a system for reducing the number of cycles required to execute a program on a data processing system which provides two-register load and store instructions, comprising: means to divide the instructions in the program into at least one region of strongly connected instructions; means to further divide each at least one region into at least one block comprising a sequential series of instructions which do not contain jump or branch instructions; means to further divide each at least one block into at least one window comprising a predefined number of instructions; means to examine each window in a region to identify load instructions and store instructions; means to determine pairs of said identified load instructions which may be replaced with a two-register load instruction and to determine pairs of said identified store instructions which may be replaced with a two-register store instruction; means to replace the preceding load instruction in each identified pair of load instructions with a predefined two-register load instruction and to remove the succeeding instruction in each identified pair of load instructions; means to replace the succeeding store instruction in each identified pair of store instructions with a predefined two-register store instruction and to remove the preceding instruction in each identified pair of store instructions; means to record addressing adjustments necessitated in a region by each said replacement of a pair of load instructions and a pair of store instructions with said region; and means to effect said addressing adjustments in each said region when replacements in said region have been completed.

According to another aspect of the present invention, there is provided a compiler having means for operating a general purpose computer system to produce object code for a target data processing system which includes two-register load instructions and two-register store instructions from program source code, comprising: means to examine said source code and produce instructions in an intermediate language employing virtual registers; means to determine pairs of load instructions and pairs of store instructions in said intermediate language employing said virtual registers which can be replaced with a single two-register load instruction or two-register store instruction respectively and to effect such replacements; means to replace references to the virtual registers allocated in said intermediate language to physical registers in said target data processing system; means to determine pairs of load instructions and pairs of store instructions in said intermediate language employing said physical registers which can be replaced with a single two-register load instruction or two-register store instruction respectively and to effect such replacements; means to produce object code for said target data processing system from the intermediate instruction language after said replacements have been effected.

Preferably, the method, system and compiler of the present invention are transparent to the user, allowing program source code to be written in the conventional manner and yet employ specific hardware features available on the data processing system the program is intended to be executed on. Also preferably, it is contemplated that the method and system of the present invention can be incorporated within existing compilers without requiring redesign of the existing compilers.

BRIEF DESCRIPTION OF THE DRAWINGS

Embodiments of the present invention will be described, by way of example only, with reference to the accompanying drawings, in which.

DETAILED DESCRIPTION OF THE PREFERRED EMBODIMENTS

The preferred embodiment of the present invention is intended to be employed with compilers for data processing systems, such as the POWER2™ computer system manufactured by IBM®, which include processor instructions to exploit specific hardware capabilities provided in the system to provide improved performance.

Specifically, the POWER2 system includes two floating point execution units (FPUs) each of which may independently calculate a 64 bit (double precision) floating point result. Instructions have been included in the instruction set of the POWER2 system to transfer 128 bits of data to and from the floating point register file with a single instruction. These instructions are referred to herein as 'quad' stores or loads.

The present invention is concerned with optimizing program instructions produced by a compiler for execution on POWER2 systems and the like such that quad load and store instructions are employed, in a manner transparent to the programmer, wherever possible. The replacement of load or store program instructions with a quad load or store instruction is referred to herein as a Quad Allocation. In the POWER2 system, when two FPU load or store instructions are replaced with one quad load or store instruction, execution time (machine cycles) for the load or store operations are halved as the quad loads or stores are executed within one instruction cycle, rather than the two cycles required for the two conventional load or store instructions.

Figure 1:
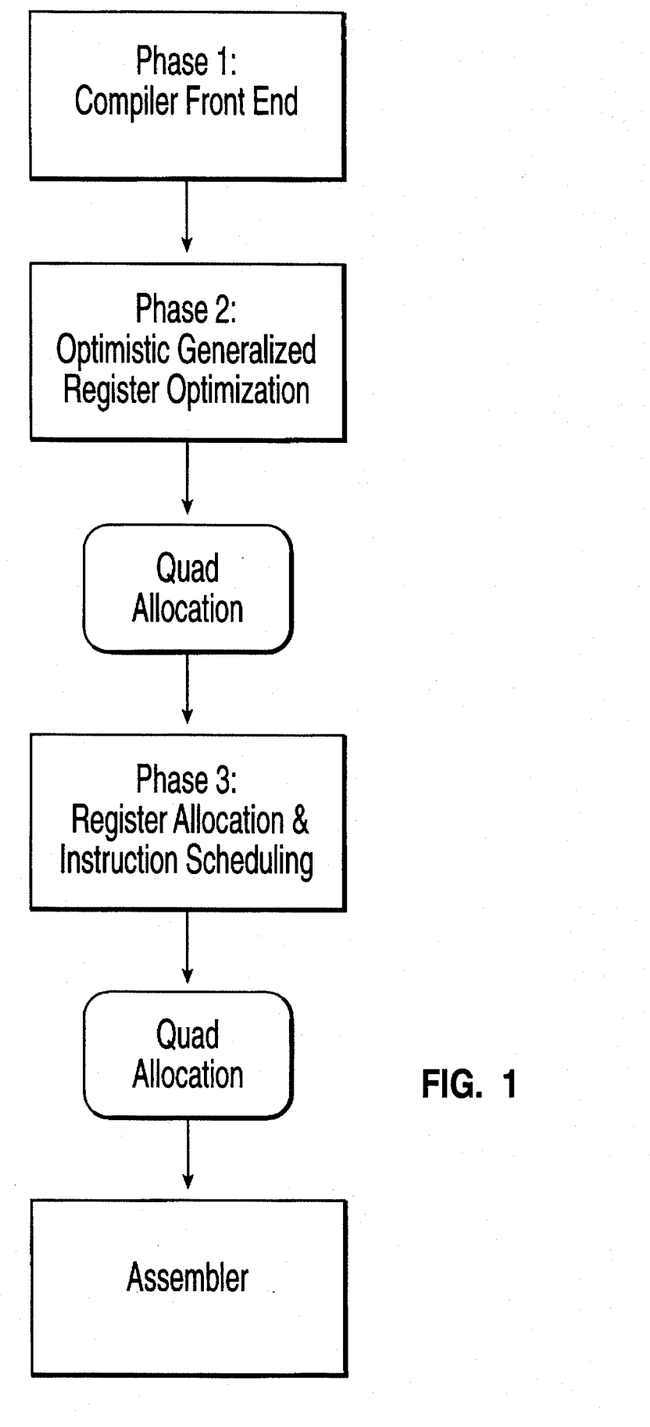
FIG. 1 shows a block diagram of a compiler including instruction optimization in accordance with the present invention.

The preferred embodiment forms part of a three-phase optimizing compiler, as shown in FIG. 1. The present invention is not limited to incorporation in any particular compiler, but is intended to be employed with optimizing compilers that produce object code for reduced instruction set computers or similar systems. As shown in FIG. 1, two Quad Allocation operations are performed, the first after Phase 2 of the compilation process, which is the Generalized Register Allocation process, and the second after Phase 3 of the compilation process, which is the Register Allocation and Instruction Scheduling process.

On reduced instruction set systems, such as the POWER2 system, a plurality of general registers are provided for the processor. As significant performance improvements are obtained when the processor is operating on registers, rather than on general memory, much of the effort in optimizing programs for such systems is spent to use the available registers effectively. When compiling a program, it is known to perform Generalized Register Allocation in one pass of the compiler wherein virtual registers are assigned to each instruction as needed. At the end of this pass, several hundred virtual registers may have been employed. In a subsequent pass of the compiler, these virtual registers are 'mapped' to the actual registers available in the system and scheduling of the instructions is performed in an attempt to optimize instruction level parallelism within the processor. The operation and design of optimizing compilers is well known to those of skill in the art and further information on this topic is available from many sources, such as U.S. Pat. No. 4,642,764, the contents of which are hereby incorporated by reference.

Appendix 1 lists definitions of the instruction mnemonics employed in this discussion. These particular mnemonics relate to an intermediate language format which may be employed in a compiler prior to the production of final object code but, as will be apparent to those of skill in the art, other mnemonics and/or instructions can be employed. A more complete discussion of such intermediate instruction mnemonics and languages can be found in U.S. Pat. No. 4,667,290, the contents of which are hereby incorporated by reference.

In the following discussion, the first Quad Allocation operation (i.e.—that after Phase 2 of the compilation process and before Phase 3) will be discussed prior to discussion of the second Quad Allocation operation.

The method of the preferred embodiment first includes the step of dividing the instructions of a program into strongly connected regions, hereinafter referred to as regions. As will be understood by those of skill in the art, a strongly connected region is a subgraph of a control flow graph wherein there is at least one path between any two nodes. While this is often a loop structure, it can also comprise the entire control flow graph that acts as a root region.

Each region is further divided into blocks, each block having a sequential series of program instructions without a branch instruction, i.e. without conditional or loop instructions.

Figure 2:
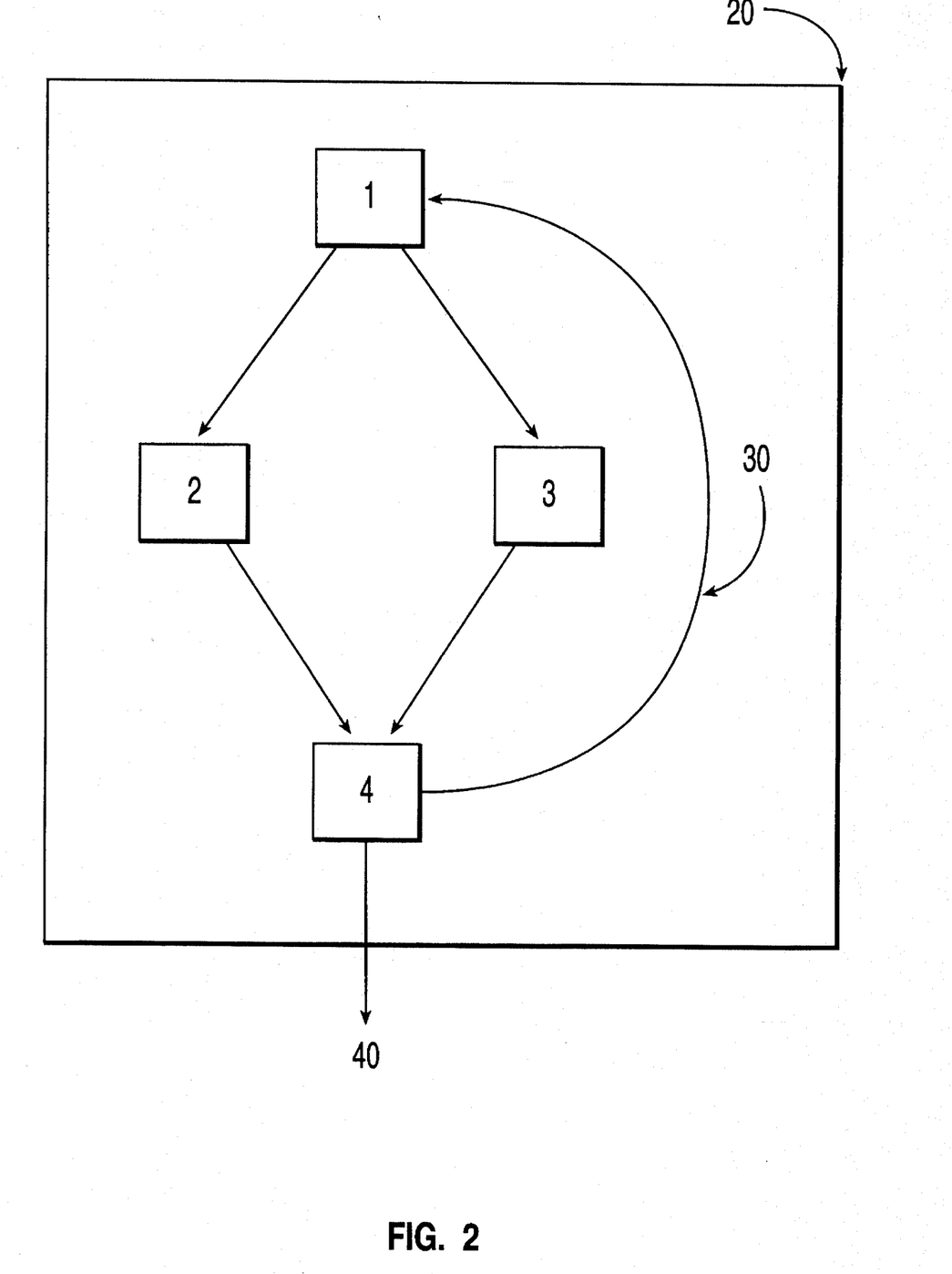
FIG. 2 shows a block diagram example of a region in accordance with the present invention.

FIG. 2 illustrates a structural diagram (often referred to as a control flowgraph) of region 20 having four blocks, labelled 1, 2, 3 and 4, respectively. The instructions of the blocks are executed and, depending upon the result at block 4, either a loop (jump) is performed back to block 1 at 30 or execution leaves the region at 40.

Figure 3:
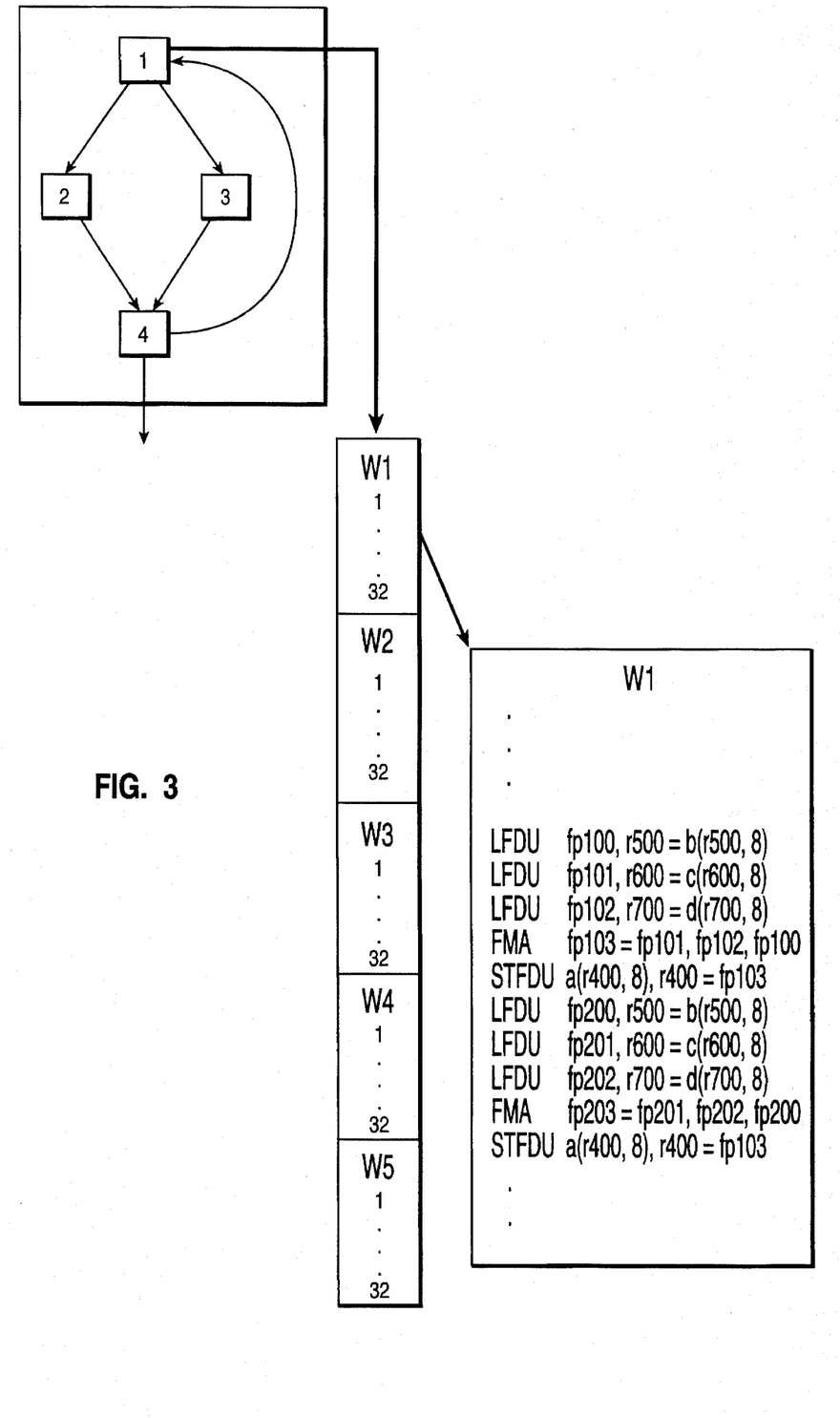
FIG. 3 shows a block diagram example of the region of FIG. 2 which has been formed into blocks and windows.

The next step includes dividing the blocks of the program into the inventor-defined term 'windows', each of which contains a predefined number of instructions. In the preferred embodiment, each window includes 32 instructions, although fewer or more instructions may be incorporated as desired. FIG. 3 illustrates how block 1 of the region of FIG. 2 has been divided into five windows, labelled W1 through W5, respectively.

The size defined for the windows is selected by the compiler designer. Selection of window size is a compromise between the actual number of quad instruction substitutions which may be accomplished and the difficulty the register allocation operation will have in mapping the virtual registers within the window to actual registers in the target system.

As described in more detail below, each window is processed in turn during the Quad Allocation operation. The instructions in a window are first examined to identify double precision load and store instructions for subsequent consideration.

A pseudocode representation of an optimization method in accordance with the present invention reads:

```
For each region, r, in the program
    for each block b
        divide each block b into windows of size w;
        for each window in b
            scan each instruction and note the location of each double precision
            load    or store instruction;
            for each load instruction, l1, in w
                for each subsequent load instruction, l2, in w
                    if l1 and l2 are eligible to become a quad load then
                        if no intermediate instruction interferes then
                            move l2 to immediately follow l1;
                            replace l1 and l2 with an appropriate
                            quad load instruction;
                            note any 'housekeeping' required;
                        else
                            if intermediate instruction uses
                        result register
                            insert register to register
                            copy instruction;
                            change intermediate
                            instruction to refer to copied
                            register;
                        end if
                    end if
                end if
            end for (l2)
        end for (l1)
        for each store, s1, in w
            for each subsequent store, s2, in w
                if s1 and s2 are eligible to become a quad store then
                    if no intermediate instruction interferes then
                        move s1 to immediately precede s2;
                        replace s1 and s2 with an appropriate
                        quad store instruction;
                        note any 'house keeping' required;
                end if
                if s1 and s2 are only ineligible to become a quad store
                because    they have the same source register and if
                source register is constant in r then
                        insert register copy instruction;
                        change either s1 or s2 to reference
```

```
                                         the copied register;
                                         replace s1 and s2 with an appropriate
                                         quad store instruction;
                                         note any 'house keeping' required;
                              end if
                           end for (s2)
                        end for (s1)
                     end for (w)
                  end for (b)
               generate required housekeeping code for region, r
            end for (r)
```

As mentioned above, after each region of a program has been divided into blocks and each block has been divided into windows, each window is processed in turn. Specifically, each window is examined to identify double precision load or store instructions. Next, each identified double precision instruction is considered to determine its eligibility as one half of a quad load or store replacement.

A simple example of a window to be considered is shown in FIG. 3 as window W1 and is given below:

```
LFDU    fp100, r500 = b(r500, 8)
LFDU    fp101, r600 = c(r600, 8)
LFDU    fp102, r700 = d(r700, 8)
FMA          fp103 = fp101, fp102, fp100
STFDU        a(r400, 8), r400 = fp103
LFDU    fp200, r500 = b(r500, 8)
LFDU    fp201, r600 = c(r600, 8)
LFDU    fp202, r700 = d(r700, 8)
FMA          fp203 = fp201, fp202, fp200
STFDU        a(r400, 8), r400 = fp103
```

These instructions represent an implementation of part of the loop, including loop unrolling, virtual registers and the above-mentioned intermediate instruction language:

```
For i = 1 to 10
   a[i] = b[i] + c[i] * d[i]
next i
```

As described in the above-mentioned Appendix 1, the LFDU instructions are intermediate language instructions for base-displacement and base-index addressing mode "Load Double Precision Floating Point with Update" operations. Specifically, for the first LFDU instruction given above, virtual register r500 stores the base address to which a displacement of eight bytes (a double precision floating point number occupies eight sequential bytes in memory) is added to obtain the address of the double precision data which is to be loaded into a virtual floating point register fp100. After the load has been effected, the base address in virtual register r500 is increased by 8 so that, after the load operation is completed, r500 contains an updated base address. Thus, the next instruction that uses r500 as a base address adds a displacement (8 for example) to it to obtain the next address.

Similarly, STFDU is an intermediate language instruction for base-displacement and base-index mode "Store Double Precision Floating Point with Update" operations. FMA is an intermediate language multiply and add instruction which performs a double precision multiplication operation on the values stored in the second and third registers and adds the result of the multiplication to the value in the first register. The result of the mathematical operations is stored in the floating point unit register to the left of the equal sign.

After the double precision load and store instructions have been identified, each identified load and store instruction is considered for replacement with one half of a quad instruction.

Appendix 2 lists the eligibility rules that are employed when attempting to replace pairs of double precision load and store instructions with quad load or quad store instructions. As will be apparent from the discussion below, the eligibility of the identified double precision load and store instructions is dependent upon the type of addressing mode employed and the type of 'housekeeping' adjustments are required.

The instructions in the window are scanned to identify the double precision load and store instructions. In this example, each of the six LFDU instructions would be identified, as would each of the two STFDU instructions. The load instructions and store instructions are next processed separately and, for the purposes of this discussion, it is assumed that the load instructions are processed first, although either operation may proceed first.

The first identified load instruction may be the first half of a substitute quad load instruction. The eligibility of each remaining load instruction that forms the other half of that substitute quad load instruction is considered, in turn, until either a matching eligible instruction is located in the window or the load instructions in the window are exhausted. In the latter case, the first identified load instruction remains unchanged and the process repeats with the next identified load instruction being assumed to be the first half of a substitute quad load instruction and the eligibility of each subsequent remaining load instruction being considered in turn. When all of the load instructions have been processed, the process is repeated for the store instructions.

From Appendix 2, the basic eligibility criteria for a pair of LFDU instructions employing base-displacement addressing is:

```
LFDU fp100, r200 = (r200,d1)
LFDU fp101, r200 = (r200,d2)
Eligible: if the absolute value of d2 = 8
```

If the pair of LFDU instructions are eligible, then the Quad Allocation Action to be performed, also from Appendix 2, is:

if d2  =   −8:
       replace with LFQU fp101, fp100, r200 = (r200, d1 + d2)
if d2  =   +8:
       replace with LFQU fp100, fp101, r200 = (r200, d1 + d2)
       with an adjustment of −8

In the example program fragment, the fourth LFDU instruction uses the same base register (r500) as the first LFDU instruction. The fourth LFDU has a displacement of 8 and, therefore, the first and fourth LFDU instructions are eligible for replacement with a single quad load instruction.

In fact, the above-mentioned eligibility of the instructions is somewhat conditional because the intervening program instructions (if any) between the two LFDU instructions must be examined to determine if they would affect, or be affected by, the substitution of the quad load instruction. Specifically, if an intervening instruction stores a value in the location that the second load is to be performed from, the instructions are not eligible, no substitution will be effected and consideration of these two instructions as a candidate pair for substitution will terminate. In such a case, if any identified instructions remain, the eligibility of the first instruction with each of the remaining identified instructions will be considered in turn until all of the possible pairings have been considered or a successful Quad Allocation has been performed.

If any intervening instruction makes use of the second instruction's result register (fp200 in this example), the substitution will proceed but an instruction will be inserted prior to the intervening instruction to copy the contents of the result register to another register and the intervening references are changed to refer to the copy. While the register copy operation imposes a performance cost (i.e.— requires an additional machine cycle), it has been found that performance of a program on which the quad substitution and register copy operations have been performed is improved over the performance of the same program in which the quad substitution and register copy operations have not been performed. This is due to the fact that the instruction scheduling operation, which is another part of the compiler's operation, has a "cleaner" block of code to work with resulting in improved instruction scheduling.

Finally, intervening updates to the base register and/or the index register (if base-indexed addressing) need to be considered. As shown in Appendix 2, updates of some specific types are allowed while others will make the instruction ineligible for substitution. Further, general eligibility requirements exist for quad allocations that require base register housekeeping adjustments. The region under consideration must be a loop structure having only a single entry point. All references to the base register under consideration must be either base-displacement update form storage references or immediate form add references. The preferred embodiment recognizes which updates are allowed and takes the necessary steps to ensure a proper substitution is performed.

If the eligibility and intervening instruction considerations are met, the Quad Allocation is performed by replacing the first instruction of the pair with the proper substitute quad instruction and deleting the second instruction of the pair. For the example code fragment above, the results of the first substitution would yield:

```
LFQU  fp100, fp200, r500 = (r500, 16)
LFDU  fp101, r600 = c(r600, 8)
LFDU  fp102, r700 = d(r700, 8)
FMA         fp103 = fp101, fp102, fp100
STFDU       a(r400, 8), r400 = fp103
LFDU  fp201, r600 = c(r600, 8)
LFDU  fp202, r700 = d(r700, 8)
FMA         fp203 = fp201, fp202, fp200
STFDU       a(r400, 8), r400 = fp103
``` with a 'housekeeping' adjustment of −8, as is described below.

In a like manner, a quad load can be substituted for the second and fifth LFDU instructions and for the third and sixth LFDU instructions to obtain the following code fragment:

```
LFQU  fp100, fp200, r500 = b(r500, 16)
LFQU  fp101, fp201, r600 = c(r600, 16)
LFQU  fp102, fp202, r700 = d(r700, 16)
FMA         fp103 = fp101, fp102, fp100
STFDU       a(r400, 8), r400 = fp103
FMA         fp203 = fp201, fp202, fp200
STFDU       a(r400, 8), r400 = fp103
``` which now requires seven machine cycles to execute rather than the ten machine cycles required by the original code fragment.

For certain substitutions, such as the above-mentioned substitution of a base-displacement LFQU instruction for two base-displacement LFDU instructions, it is necessary to perform some additional 'housekeeping' adjustments to the base registers.

In the example program fragment, the first LFDU load operation (prior to the replacement of the first LFDU instruction with the LFQU instruction) loads a double precision value from some effective address (the contents of r500+the 8 byte displacement), for example, 1008. If no adjustment was made, in this situation, when the LFQU instruction is substituted for the LFDU, the load of the two double precision values would be from effective address 1016 (the contents of r500+the 16 byte displacement). Accordingly, an adjustment needs to be performed to the base register prior to entering the loop to obtain the correct initial address. Specifically, as indicated in Appendix 2, for the substitution of an LFQU for two LFDU instructions, an adjustment of −8 needs to be performed on the base register prior to entry into the loop.

To avoid errors in subsequent (out of region) uses of the base register when a base register, adjustment is required, a copy is made of the base register, The adjustment is performed on the copy of the base register and all references to the base register within the region are changed to refer to the copy of the base register. Upon exit of the region, the base register is updated to the new value of the copied register with the same adjustment applied in reverse. Reverse adjustments could be performed directly on the base register, therefore eliminating the need for a copy of the register. However, it has been found that making a copy of the base register for the region of program code allows for more effective register allocation.

In summary, a register copy instruction is inserted to obtain the copy of the base register, the adjustment of −8 is performed to the copied register to load the register with the contents of r500 less 8 (i.e. 992 in our example), and the instructions to update the base register are added to each exit point from the region.

When Quad Allocations requiring housekeeping adjustments are being considered within a region, the consideration of the eligibility of instructions for replacement involves the additional step of verifying that conflicting housekeeping adjustments are not required. Specifically, if an adjustment of −8 is required for a particular base register, then no subsequent Quad Allocation using the same base register can be performed if it requires an adjustment of other than −8. If the subsequent Quad Allocation requires an adjustment of −8, or if it requires no adjustment, then the Quad Allocation may proceed normally. It is important to note that adjustments do not accumulate, i.e.—if three Quad Allocations are performed for instructions using a single base register and each Quad Allocation has an associated adjustment of −8, the base register is only adjusted by −8 and not by −24.

When processing of load instructions has been completed, store instructions are next considered. Processing of store instructions proceeds in much the same way as loads with the following differences. The second instruction of the pair is replaced with the appropriate substitute quad instruction and the first instruction is deleted. Any intervening instruction which modifies the register containing the data to be stored by the first store instruction prevents the quad allocation. Any intervening instruction which may reference or store to the location at which the data is to be stored by the first store instruction of the pair prevents the substitution. As was the case with loads, intervening updates to the base register and/or the index register (if base-indexed addressing) also need to be considered. As shown in Appendix 2, updates of some specific types are allowed while others will make the first store instruction ineligible for substitution.

Also, an additional check is performed when considering the eligibility of pairs of stores. If a pair of store instructions are ineligible because their source registers are the same, a check is performed to determine if the source register is a constant within the region (loop invariant). If the source register is a constant within the region, a register copy operation is performed prior to entering the loop to create two distinct copies of the register. One of the two instructions that referred to the register is modified to refer to the copy of the register. In this manner, a Quad Allocation may be performed on the pair of store instructions.

When the first Quad Allocation operation has been performed, Phase 3 of the compilation process proceeds conventionally with the mapping of virtual registers to actual registers in the data processing system and scheduling of the program instructions.

After Phase 3 of the compilation process is complete, the second Quad Allocation operation is performed. This operation is similar to the first Quad Allocation operation described above with the following differences.

For the second Quad Allocation operation, any instruction pairings which would require housekeeping adjustments are deemed to be ineligible for Quad Allocation. This is because base register housekeeping adjustments require the allocation of a new register which is not possible at this point. Similarly, any instruction pairings whose source registers (for loads) or target registers (for stores) are not adjacent are deemed ineligible for Quad Allocation. However, in this case, a further check can be performed to determine whether an adjacent pair of registers are available. If such a pair of registers is available, references to the original non-adjacent registers are converted to references to the available adjacent registers and the Quad Allocation is performed.

The present invention has been implemented and tested on the POWER2 data processing system as manufactured and sold by IBM. In tests of the present invention, the LINPACK benchmark program was compiled and executed both with and without the Quad Allocation optimizations described above. On the test system, which was an IBM POWER2 Model 590, the LINPACK benchmark yielded 72 MFLOPS when compiled without the Quad Allocation optimizations and yielded 117 MFLOPS when compiled with the Quad Allocation optimizations, yielding an approximate 62% improvement. While these tests were not performed under the normal controlled conditions for such benchmarking tests, the present inventor believes that they do indicate the order of improvement afforded by the present invention. It is contemplated by the inventor that similar or better improvements in execution speed can be obtained in many circumstances.

While the above discussion of the preferred embodiment of the present invention relates only optimization of loads and stores for a floating point unit, it will be apparent to those of skill in the art that the present invention is not so limited and may be used to accomplish optimized two-register loads and stores of any type as appropriate.

APPENDIX 1

Note: rXXX and fpXXX correspond to integer and floating point registers respectively. The register numbers do not necessarily correspond to actual registers of the data processsing system, as the first Quad Allocation operation is performed on virtual registers.

LFL     fp100=a(r200,d)
Loads a double precision value into floating point refister fp100 from variable a in memory using base-displacement addressing, i.e - from memory equal to the address stored in register r200 plus a displacement of d.

LFL     fp100=a(r200,r201)
Loads a double precision value into floating register fp100 from variable a in memory using base-index addressing, i.e - from memory address equal to the address stored in register r200 plus a displacement value stored in index register r201.

LFDU    fp100,r200=a(r200,d)
Loads a double precision value into floating point register fp100 from variable a in memory using base-displacement addressing and updates register r200 to equal r200 + d.

LFDU    fp100,r200=a(r200,r201)
Loads a double precision value into floating point register fp100 from variable a in memory using base-index addressing and updates register r200 to equal r200 + r201.

STFL    a(r200,d)=fp100
Stores a double precision value from register fp100 to variable a in memory, using base-displacement addressing (i.e - stored at address equal to r200 + d)

STFL    a(r200,r201)=fp100
Stores a double precision value from register fp100 to variable a in memory using base-index

APPENDIX 1-continued addressing (i.e - stored at address equal to r200 + r201)

STFDU     a(r200,d),r200=fp10
Stores a double precision value from register fp100 to variable a in memory, using base-displacement addressing and updates r200 to equal r200 + d STFDU     a(r200,r201),r200=fp100
Stores a double precision value from register fp100 to variable a in memory, using base-displacement addressing and updates r200 to equal r200 + d LFQ     fp100,fp101=a(r200,d)
Loads two double precision values sequentially from variable a in memory using base-displacement addressing LFQ     fp100,fp101=a(r200,r201)
Loads two double precision values sequentially from variable a in memory using base-index addressing LFQU     fp100,fp101,r200=a(r200,d)
Loads two double precision values sequentially from variable a in memory using base-displacement addressing and updates r200 to equal r200 + d LFQU     fp100,fp101,r200=a(r200,r210)
Loads two double precision values sequentially from variable a in memory using base-index addressing and updates r200 to equal r200 + r201

STFQ     a(r200,d)=fp100,fp101
Stores two double precision values from registers fp100 and fp101 sequentially into variable a in memory using base-displacement addressing STFQ     a(r200,r210)=fp100,fp101
Stores two double precision values from registers fp100 and fp101 sequentially into variable a in memory using base-index addressing STFQU     a(r200,d)r200=fp100,fp101
Stores two double precision values from registers fp100 and fp101 sequentially into variable a in memory using base-displacement addressing and updates r200 to equal r200 + d STFQU     a(r200,r210),r200=fp100,fp101
Stores two double precision values from registers fp100 and fp101 sequentially into variable a in memory using base-index addressing and updates r200 to equal r200 + r201

APPENDIX 2

BASE-INDEX ADDRESSING:

```
LFL           fp100=(r200,r201)
              ... r200 updated by k by intervening instructions
LFL           fp101=(r200,r201)
    Eligible:    if k=8
    Action:   LFQ  fp100,fp101=(r200,r201)
LFDU  fp100,r200=(r200,r201)
LFL           fp101=(r200,d)
    Eligible:    if d=8
    Action:   LFQU fp100,fp101=(r200,r201)
STFDU (r200,r201),r200=fp100
STFL          (r200,d)=fp101
    Eligible:    if d=8
    Action:   STFQU (r200,r201)=fp100,fp101
```

BASE-DISPLACEMENT ADDRESSING:

```
LFL           fp100=(r200,d1)
LFL           fp101=(r200,d2)
    Eligible:    if the absolute value of d2 − d1 = 8
    Action: if (d1 > d2)    LFQ   fp101,fp100=(r200,d2)
            if (d1 < d2)    LFQ   fp100,fp101=(r200,d1)
STFL          (r200,d1)=fp100
STFL          (r200,d2)=fp101
    Eligible:    if the absolute value of d2 − d1 = 8
    Action:             STFQ  (r200,d2)=fp101,fp100
            if (d1 < d2)    STFQ  (r200,d1)=fp100,fp101
LFL           fp100=(r200,d1)
              ... r200 updated by k by intervening instructions
LFL           fp101=(r200,d2)
    Eligible:    if the absolute value of (d2 − d1 + k) = 8
    Action: if (d2 + k < d1)  LFQ   fp101,fp100=(r200,d2+k)
            if (d2 + k > d1)  LFQ   fp100,fp101=(r200,d1)
STFL          (r200,d1)=fp100
              ... updated by k by intervening instructions
STFL          (r200,d2)=fp101
    Eligible:    if the absolute value of (d2 − d1 + k) = 8
    Action: if (d2 + k < d1)          STFQ  (r200,d2)=fp101,fp100
            if (d2 + k > d1)          STFQ  (r200,d1−k)=fp100,fp101
LFL           fp100=(r200,d1)
LFDU  fp101,r200=(r200,d2)
    Eligible:    if the absolute value of (d2 − d1) = 8
    Action: if (d1 > d2)       LFQU  fp101,fp100,r200=(r200,d2)
            if (d1 < d2)       LFQU  fp100,fp101,r200=(r200,d2)
                                         with adjustment of −8
STFL          (r200,d1)=fp100
STFDU (r200,d2),r200=fp101
    Eligible:    if the absolute value of (d2 − d1) = 8
    Action: if (d1 > d2)       STFQU (r200,d2),r200=fp101,fp100
            if (d1 < d2)  STFQU       (r200,d2),r200=fp100,fp101
                                         with adjustment of −8
LFDU  fp100,r200=(r200,d1)
LFDU  fp101,r200=(r200,d2)
    Eligible:    if the absolute value of d2 = 8
    Action: if (d2 < 0)        LFQU  fp101,fp100,r200=(r200,d1+d2)
```

APPENDIX 2-continued

```
                    if (d2 > 0)      LFQU    fp100,fp101,
                                              r200=(r200,
                                              d1+d2)
                                              with adjustment of −8
STFDU  (r200,d1),r200=fp100
STFDU  (r200,d2),r200=fp101
       Eligible:      if the absolute value of d2 = 8
       Action: if (d2 < 0)      STFQU    (r200,d1+d2),r200=fp101,
                                         fp100
                    if (d2 > 0)      STFQU  (r200,d1+d2),
                                            r200=fp100,
                                            fp101
                                            with adjustment of −8
LFDU   fp100,r200=(r200,d1)
       ... r200 updated by k by intervening instructions
LFDU   fp101,r200=(r200,d2)
       Eligible:      of the absolute value of (d2 + k) = 8
       Action: if (d2 + k < 0)    LFQU     fp101,fp100,r200=(r200,
                                           d1+d2)
                                           with adjustment of k
                    if (d2 + k > 0)   LFQU   fp100,fp101,
                                             r200=(r200,d1+
                                             d2)
STFDU  (r200,d1),r200=fp100
       ... r200 updated by k by intervening instructions
STFDU  (r200,d2),r200=fp101
       Eligible:      if the absolute of (d2 + k) = 8
       Action:    if (d2 + k < 0)    STFQU (r200,d1+d2),r200=
                                           fp100,fp101
                    if (d2 + k > 0) STFQU       (r200,d1+d2),
                                                r200=fp100,
                                                fp101
                                                with adjustment of −8
LFDU   fp100,r200=(r200,d1)
LFL              fp101=(r200,d2)
       Eligible:      if the absolute value of d2 = 8
       Action: if (d2 < 0)      LFQU      fp101,fp100,r200=
                                          (r200,d1)
                                          with adjustment of −8
                    if (d2 > 0)      LFQU    fp100,fp101,
                                             r200=(r200,d1)
STFDU  (r200,d1),r200=fp100
STFL             (r200,d2)=fp101
       Eligible:      if the absolute value of d2 = 8
       Action: if (d2 < 0)      STFQU    (r200,d1),r200=fp101,
                                         fp100
                                         with adjustment of −8
                    if (d2 > 0)     STFQU   (r200,d1),r200=
                                            fp100,fp101
LFDU   fp100,r200=(r200,d1)
       ... r200 updated by k by intervening instructions
LFL              fp101=(r200,d2)
       Eligible:      if the absolute value of (d2 + k) = 8
       Action: if (d2 + k < 0)    LFQU     fp101,fp100,r200=
                                           (r200,d1)
                                           with adjustment of −8
                    if (d2 + k > 0)   LFQU   fp100,fp101,
                                             r200=(r200,d1)
STFDU  (r200,d1),r200=fp100
       ... r200 updated by k by intervening instructions
STFL             (r200,d2)=fp101
       Eligible:      if the absolute value of (d2 + k) = 8
       Action: if (d2 + k < 0)    STFQU    (r200,d1),r200=
                                           fp101,fp100
                                           with adjustment of −8
                    if (d2 + k > 0)    STFQU  (r200,d1),r200=
                                              fp100,fp101
                                              with adjustment of −k
```

What is claimed is:

1. A method of reducing the number of cycles required to execute a program on a data processing system which provides two-register load and store instructions, comprising the steps of:

(i) dividing the instructions of the program into at least one region of strongly connected instructions;

(ii) subdividing each said at least one region into at least one block of instructions, each said block comprising a sequential series of instructions without jump or branch instructions;

(iii) subdividing each said block into at least one window, each said window comprising a predefined number of instructions;

(iv) for each window in a region, examining each of the instructions in the window to identify load instructions and store instructions;

(v) for each identified load instruction, determining if another identified load instruction exists in the same window with which said identified instruction may be paired for replacement with a two-register load instruction;

(vi) for each determined pair of identified load instructions, replacing the identified load instruction in the pair which precedes the other identified load instruction in the pair with an appropriate two-register load instruction, deleting the other identified load instruction in the pair and noting any addressing adjustments necessitated by said replacement;

(vii) for each identified store instruction, determining if another identified store instruction exists in the same window with which said identified instruction may be paired for replacement with a two-register store instruction;

(viii) for each determined pair of identified store instructions, deleting the identified store instruction which precedes the other identified store instruction in the pair, replacing the other identified store instruction with an appropriate two-register store instruction and noting any addressing adjustments necessitated by said replacement;

(ix) affecting said addressing adjustments noted in steps (vi) and (ix) for the region containing said windows; and (x) repeating steps (iv) through (ix) for each region.

2. The method of claim 1 wherein steps (i) through (x) are included in a program compilation process.

3. The method of claim 2 wherein steps (i) through (x) are performed after generalized register allocation has been performed and prior to register allocation in said compilation process.

4. The method of claim 3 wherein steps (i) through (x) are performed again after register allocation in said compilation process.

5. The method of claim 1 wherein a predefined table is employed to determine whether an identified load instruction may be paired with another load instruction for replacement with a two-register load instruction and whether an identified store instruction may be paired with another store instruction for replacement with a two-register store instruction.

6. The method of claim 5 wherein said predefined table is also employed to identify addressing adjustments required as a result of instruction replacement.

7. A system for reducing the number of cycles required to execute a program on a data processing system which provides two-register load and store instructions, comprising:

means to divide the instructions in the program into at least one region of strongly connected instructions;

means to further divide each at least one region into at least one block comprising a sequential series of instructions which do not contain jump or branch instructions;

means to further divide each at least one block into at least one window comprising a predefined number of instructions;

means to examine each window in a region to identify load instructions and store instructions;

means to determine pairs of said identified load instructions which may be replaced with a two-register load instruction and to determine pairs of said identified store instructions which may be replaced with a two-register store instruction;

means to replace the preceding load instruction in each identified pair of load instructions with a predefined two-register load instruction and to remove the succeeding instruction in each identified pair of load instructions;

means to replace the succeeding store instruction in each identified pair of store instructions with a predefined two-register store instruction and to remove the preceding instruction in each identified pair of store instructions;

means to record addressing adjustments necessitated in a region by each said replacement of a pair of load instructions and a pair of store instructions with said region; and means to effect said addressing adjustments in each said region when replacements in said region have been completed.

8. The system of claim 7 further comprising a compiler means including a generalized register allocation operation and a subsequent register allocation operation, wherein the instructions in the program are produced by said generalized register allocation operation.

9. The system of claim 8 wherein the instructions in the program are produced by said register allocation operation.

10. The system of claim 7 further comprising memory means including a predefined table of requirements to determine if at least one of a pair of store instructions and a pair of load instructions may be replaced with a two-register store instruction and a two-register load instruction, respectively and any addressing adjustments necessitated by such replacements.

11. Data storage media recorded with a compiler program which, in combination with a general purpose computer equipped to read into memory and execute program data from the storage media, constitutes the system in accordance with claim 7.

12. A compiler having means for operating a general purpose computer system to produce object code for a target data processing system which includes two-register load instructions and two-register store instructions from program source code, comprising:

means to examine said source code and produce instructions in an intermediate language employing virtual registers;

means to determine pairs of load instructions and pairs of store instructions in said intermediate language employing said virtual registers which can be replaced with a single two-register load instruction or two-register store instruction respectively and to effect such replacements;

means to replace references to the virtual registers allocated in said intermediate language to physical registers in said target data processing system;

means to determine pairs of load instructions and pairs of store instructions in said intermediate language employing said physical registers which can be replaced with a single two-register load instruction or two-register store instruction respectively and to effect such replacements;

means to produce object code for said target data processing system from the intermediate instruction language after said replacements have been effected.

* * * * *